United States Patent [19]
Bauer et al.

[11] Patent Number: 6,109,004
[45] Date of Patent: Aug. 29, 2000

[54] DEVICE FOR SEAL-WELDING OF A HIGH-PRESSURE VESSEL

[75] Inventors: Harald Bauer; Manfred Gebers, both of Kirchheim; Peter Siebenrock, Langenenslingen, all of Germany

[73] Assignee: MBB Airbag Systems GmbH, Kirchheim, Germany

[21] Appl. No.: 09/199,577

[22] Filed: Nov. 25, 1998

[30] Foreign Application Priority Data

Nov. 26, 1997 [DE] Germany ............................ 197 52 326

[51] Int. Cl.⁷ .................................................. B65B 31/00
[52] U.S. Cl. ............................ 53/408; 53/88; 53/DIG. 2; 53/471
[58] Field of Search ................................. 53/404, 408, 80, 53/88, DIG. 2, 471

[56] References Cited

U.S. PATENT DOCUMENTS

| | | | |
|---|---|---|---|
| 828,381 | 8/1906 | Burckett | 53/88 |
| 940,123 | 11/1909 | Brenzinger | 53/88 |
| 2,016,045 | 10/1935 | Munters | 53/408 |
| 2,921,422 | 1/1960 | Sprinkle | 53/80 |
| 3,541,755 | 11/1970 | Bobrakov | 53/88 |
| 3,983,678 | 10/1976 | Bogler | 53/88 |
| 5,231,261 | 7/1993 | Duthoo | |

FOREIGN PATENT DOCUMENTS

| | | | |
|---|---|---|---|
| 2 384 199 | 10/1978 | France | |
| 2623856 | 6/1989 | France | |
| 1196020 | 7/1965 | Germany | 53/88 |

*Primary Examiner*—John Sipos

[57] ABSTRACT

A device for receiving, filling, and seal-welding a high-pressure vessel that can be received and clamped between an upper lid and a lower lid. A filling chamber is provided in the upper lid. The chamber is open on one side to a filling hole in the facing wall of the high-pressure vessel and sealed tightly at the other end by a disk made of transparent crystalline material. An interruptible filling line terminates in the chamber, and with a welding energy radiation source being located above the disk, whose radiation penetrates the crystalline material, is simpler in construction and universally applicable as well as operationally more economical. The upper lid, on its side facing the high-pressure vessel, has an annular seal which can be brought into tight contact with the facing wall of the high-pressure vessel.

12 Claims, 1 Drawing Sheet

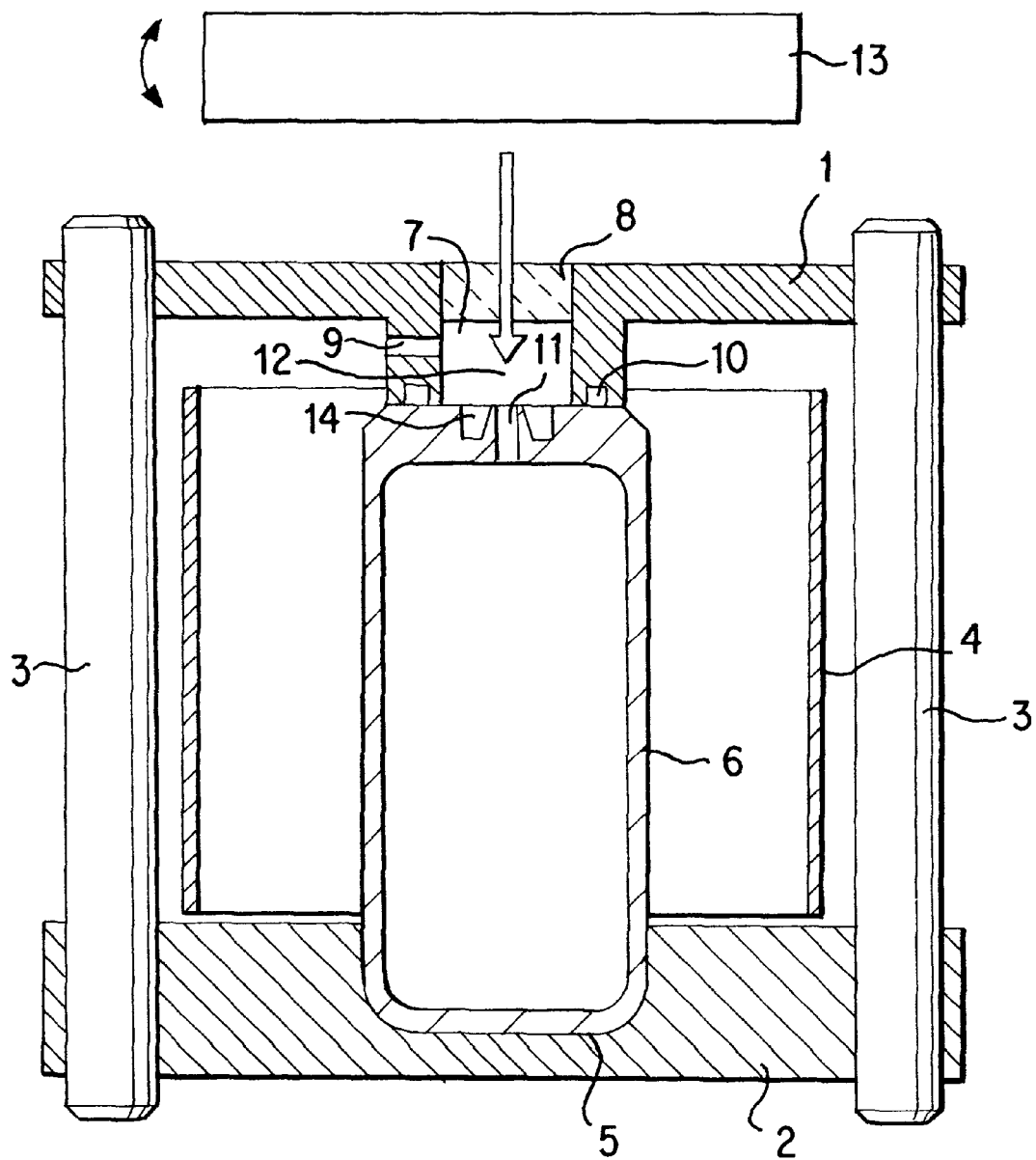

DEVICE FOR SEAL-WELDING OF A HIGH-PRESSURE VESSEL

BACKGROUND OF THE INVENTION

This application claims the priority of German patent application 197 52 326.9, filed Nov. 26, 1997, the disclosure of which is expressly incorporated by reference herein.

The present invention relates to a device for receiving, filling, and seal-welding of a high-pressure vessel which can be received and clamped between an upper lid and a lower lid, with a filling chamber being provided in the upper lid. The chamber is open on one side to a filling hole in the facing wall of the high-pressure vessel and sealed tightly at the other end by a disk made of transparent crystalline material. An interruptible filling line terminates in the chamber, and a welding energy radiation source is located above the disk whose radiation penetrates the crystalline material.

In a known device described in DE 42 08 841 C1, an upwardly directed central blind hole is provided in an upper lid that forms a part of a chamber. On the lid, an upper cover is additionally provided, with an annular seal being located in the circumferential area of the blind hole. A high-pressure vessel can be introduced into this blind hole with its annular seal by its upper cylindrical neck piece in order to be able to fill the high-pressure vessel and to seal weld it, with the vessel being clamped by the lower lid.

A particular disadvantage of this known device is the fact that only high-pressure vessels with upper cylindrical neck pieces with close tolerances can be received and processed. In addition, high-pressure vessels can only be introduced into this known device from below, because the chamber has a closed circumferential wall.

SUMMARY OF THE INVENTION

An object of the present invention is to provide a device that is simpler in construction, universally applicable, and operates more economically.

This object has been achieved in accordance with the present invention by the upper lid having on its side facing the high-pressure vessel an annular seal which can be applied to the facing wall of the high-pressure vessel for a sealed connection.

With this device, high-pressure vessels with flat or convex walls facing the upper lid can be received and processed, even if they must be introduced from the side against the upper lid before the tension is applied by the upper lid. A laser, for example a commercial ND-YAG laser, can be used as the radiation source.

An especially simple configuration of the device according to the present invention can be achieved by clamping the upper and lower lids against one another by at least two columns. Splinter shielding can be provided inside the columns to protect the environment from splinters if the high-pressure vessel should burst when being filled.

Advantageously, the filling hole in the high-pressure vessel can be located in the downward extension of the central axis of the filling chamber, thereby resulting in an axially symmetrical design for the device.

On one hand, the radiation source can be rigidly located on the upward extension of the central axis of the filling chamber. As a result, the welding energy is applied centrally in the filling hole. On the other hand, the radiation source can be located in the upward extension of the central axis of the filling chamber so that it is pivotable by a small angle, and can be rotated around the central axis. As a result, the filling hole can be welded by passing the radiation one or more times around the edge of the filling hole.

In order to allow the air originally contained in the high-pressure vessel to be sucked out through the filling chamber, the filling chamber can be connected to an evacuation device.

If the high-pressure vessel is to be filled with a reactive gas, the reactive gas must be pushed away from the area where the welding is taking place during the welding process. This is achieved by providing an interruptible line for weld shielding which gas also terminates in the filling chamber.

Welding can be improved and facilitated as a result under certain conditions by the wall of the high-pressure vessel facing the filling chamber having an indentation that surrounds the filling hole.

The terms "up" and "down" used above are employed only to simplify the description and do not necessarily refer to a certain position of the parts in space. Because the operation of the device is not subject to the influence of gravity, the orientation of the device and hence the position of the parts thereof in space can be chosen as desired. The above limitation of the meaning of the terms "up" and "down" also applies to the following description of the embodiment and its representation in the drawings.

BRIEF DESCRIPTION OF THE DRAWING

These and further objects, features and advantages of the present invention will become more apparent from the following detailed description of a currently preferred embodiments when taken in conjunction with the accompanying drawing wherein:

The sole FIGURE shows a vertical central section through an embodiment of a device according to the present invention.

DETAILED DESCRIPTION OF THE DRAWINGS

An upper lid 1 and a lower lid 2 are connected by two columns 3 and can be clamped against one another by conventional clamping means. A splinter shield 4 in the form of a cylindrical jacket is provided inside columns 3 between the two lids 1, 2. Lower lid 2 has a cylindrical recess 5 on its top into which a high-pressure vessel 6 to be filled is introduced. The upper lid 1 has a filling chamber 7 located centrally, which chamber 7 is sealed tight at the top by a disk 8 made of transparent crystalline material. The filling chamber 7 has a filling opening 9 located laterally in which a filling line terminates. The filling chamber 7 is open at the bottom. On the underside of upper lid 1, the opening of the filling chamber 7 has an annular seal 10 located therearound.

When the high-pressure vessel 6 is inserted with a filling hole 11 located centrally in its upper wall, the annular seal 10, under the influence of the tensioning of the two lids 1, 2 against one another, abuts the upper wall of the high-pressure vessel 6 with a sealing action. The filling hole 11 of the high-pressure vessel 6 is located on the downward extension of central axis 12 of the filling chamber 7. A radiation source 13 is located in the upper extension of central axis 12 of the filling chamber 7, either rigidly or pivotable by a small angle (as shown by the double-headed arrow) and rotatable around the central axis 12.

An evacuating device (not shown) can be connected to filling chamber 7. In addition, a supply line for weld-shielding gas can also terminate in filling chamber 7, either through the filling opening 9 or through an additional opening. The upper wall of the high-pressure vessel 6 has an annular indentation 14 surrounding the filling hole 11. The material located between the filling hole 11 and the indentation 14 is processed during the seal-welding of the filling hole 11.

The device according to the present invention operates as follows.

a. Insertion and clamping of a high-pressure vessel 6 between lids 1, 2;

b. Exhausting the air contained in high-pressure vessel 6 by the evacuation device, if necessary;

c. Filling the high-pressure vessel 6 with a filling gas;

d. Increasing the pressure of the filling gas in the high-pressure vessel 6 to the test pressure;

e. Lowering the pressure of the filling gas in the high-pressure vessel 6 to the filling pressure;

f. Introducing the weld-shielding gas into the high-pressure vessel 6 with a pressure slightly above filling pressure, causing the filling gas to be pushed away from the vicinity of the welding if necessary;

g. Gas-tight welding of the filling hole 11 by radiation source 13.

h. Lowering the pressure in the filling chamber 7 to ambient pressure.

i. Relieving the tension between the lids 1, 2 and removing the finished high-pressure vessel 6.

The introduction of a weld-shielding gas (step f.) is especially necessary if the filling gas is a reactive gas.

In the device according to the invention, no welding material is added. This has the advantage that the weight of the high-pressure vessel does not change and consequently the weight of the filling gas that has been added can be measured exactly. The radiation source 13 can generate pulsed or constant radiation and can operate with fixed or movable guidance of the radiation. A radiation source 13 can be used alternately in several devices according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for receiving, filling, and seal-welding of a high-pressure vessel arranged to be received and clamped between an upper lid and a lower lid, comprising a filling chamber provided in the upper lid, said filling chamber being open at one end thereof to a filling opening in an opposed facing wall of the high-pressure vessel and tightly sealed at another end thereof by a transparent crystalline disk, and an interruptible filling line terminating in said filling chamber, and a welding energy radiation source located above the disk to pass radiation through the crystalline disk, wherein the upper lid has a side thereof facing the high-pressure vessel, which side has an annular seal arranged to be brought into a sealing contact with the opposed facing wall of the high-pressure vessel.

2. Device according to claim 1, wherein the radiation source is a laser.

3. Device according to claim 1, wherein the upper and lower lids are tensionable against one another by at least two columns.

4. Device according to claim 3, wherein splinter shielding is provided inside the at least two columns.

5. Device according to claim 1, wherein a filling hole is located in high-pressure vessel on a downward extension of a central axis of the filling chamber.

6. Device according to claim 5, wherein the radiation source is rigidly located on an upward extension of a central axis of the filling chamber.

7. Device according to claim 5, wherein the radiation source is located on a central axis of and above the filling chamber, and is pivotable by a small angle and rotatable around a central axis.

8. Device according to claim 1, wherein the filling chamber is connectable to an evacuating device.

9. Device according to claim 1, wherein an interruptible supply line for weld shielding gas also terminates in the filling chamber.

10. Device according to claim 1, wherein a wall of the high-pressure vessel which faces the filling chamber has an indentation surrounding the filling opening.

11. An arrangement for filling and seal-welding a high pressure vessel, comprising:

an upper lid;

a lower lid;

said upper and lower lids being operable to clamp a high pressure vessel therebetween during vessel filling operations with said upper lid having a radiation transparent section facing the high pressure vessel for accommodating radiation seal-welding of a filling opening of the high pressure vessel;

a filling opening in the upper lid communicating with the filling opening of the high pressure vessel during filling operations;

a sealing device carried by the upper lid and sealingly engageable with an opposed wall of the high pressure vessel facing the transparent section, said sealing device surrounding the filling opening during filling operations; and a radiation source for applying radiation energy through the radiation transparent section to seal-weld the high pressure vessel filling opening after filling thereof.

12. A method for filling and seal-welding a high pressure vessel, comprising:

clamping a high pressure vessel between an upper lid and a lower lid;

filling the pressure vessel via a filling opening in the upper lid which communicates with a filling opening in the high pressure vessel;

providing a sealing arrangement at the upper lid which is sealingly engageable with an opposed wall of the high pressure vessel facing a transparent section of the upper lid and defines an area which surrounds the filling opening of the high pressure vessel; and applying radiation welding energy through the transparent section of the upper lid to seal-weld the high pressure vessel within the defined area subsequent to filling.

* * * * *